(12) United States Patent
Reinhardt et al.

(10) Patent No.: US 8,911,203 B2
(45) Date of Patent: Dec. 16, 2014

(54) FAN ROTOR SUPPORT

(75) Inventors: Gregory E. Reinhardt, South Glastonbury, CT (US); Karl D. Blume, Hebron, CT (US); John P. Tirone, III, Moodus, CT (US); John C. Ditomasso, Glastonbury, CT (US); Enzo DiBenedetto, Kensington, CT (US); Jason W. Mazanec, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/524,453

(22) Filed: Jun. 15, 2012

(65) Prior Publication Data

US 2012/0251306 A1  Oct. 4, 2012

Related U.S. Application Data

(63) Continuation-in-part of application No. 12/622,535, filed on Nov. 20, 2009, now Pat. No. 8,439,637.

(60) Provisional application No. 61/498,515, filed on Jun. 17, 2011, provisional application No. 61/593,184, filed on Jan. 31, 2012.

(51) Int. Cl.
*F01D 25/28* (2006.01)
*F02C 3/107* (2006.01)
*F02K 3/06* (2006.01)

(52) U.S. Cl.
CPC ............... *F02C 3/107* (2013.01); *F01D 25/28* (2013.01); *F02K 3/06* (2013.01)
USPC ..................... 415/122.1; 415/124.2; 415/229

(58) Field of Classification Search
USPC .................. 415/229, 230, 232, 60, 61, 121.3, 415/122.1, 110, 111
See application file for complete search history.

(56) References Cited

U.S. PATENT DOCUMENTS 3,754,484 A    8/1973  Roberts
4,722,184 A *  2/1988  Chaplin et al. ............... 60/226.1
(Continued)

FOREIGN PATENT DOCUMENTS

EP    1918527 A2    5/2008
EP    2325458 A2    5/2011
(Continued)

OTHER PUBLICATIONS

Jane's Aero-Engines, Edited by Bill Gunston, Issue Seven, Mar. 2000, pp. 510-512, United Kingdom.

(Continued)

*Primary Examiner* — Edward Look
*Assistant Examiner* — Jesse Prager
(74) *Attorney, Agent, or Firm* — Bachman & LaPointe, P.C.

(57) ABSTRACT

A turbofan engine comprises an engine case. A gaspath extends through the engine case. A fan has a circumferential array of fan blades. A fan case encircles the fan blades radially outboard of the engine case. A plurality of fan case vanes extend aftward and outward from the engine case to the fan case. A forward frame comprises a plurality of vanes radially across the gaspath. A torque box couples the fan case vanes to the forward frame. A transmission couples a shaft to a fan shaft to drive the fan. A fan bearing assembly couples a stationary forward hub structure to the fan shaft.

25 Claims, 5 Drawing Sheets

(56) References Cited

U.S. PATENT DOCUMENTS

| | | | |
|---|---|---|---|
| 5,433,674 | A | 7/1995 | Sheridan et al. |
| 6,223,616 | B1* | 5/2001 | Sheridan .................. 74/468 |
| 7,101,145 | B2* | 9/2006 | Tsuchiya et al. ............ 415/119 |
| 7,591,754 | B2 | 9/2009 | Duong et al. |
| 7,654,075 | B2 | 2/2010 | Udall |
| 7,694,505 | B2 | 4/2010 | Schilling |
| 7,824,305 | B2 | 11/2010 | Duong et al. |
| 7,926,260 | B2 | 4/2011 | Sheridan et al. |
| 8,205,432 | B2 | 6/2012 | Sheridan |
| 2005/0008494 | A1 | 1/2005 | Tsuchiya et al. |
| 2007/0084218 | A1* | 4/2007 | Udall .................. 60/796 |
| 2008/0098717 | A1* | 5/2008 | Orlando et al. ............ 60/226.1 |
| 2009/0056343 | A1 | 3/2009 | Suciu et al. |
| 2009/0092487 | A1 | 4/2009 | McCune et al. |
| 2009/0246018 | A1* | 10/2009 | Kondo et al. ............... 415/229 |
| 2011/0123326 | A1 | 5/2011 | DiBenedetto et al. |

FOREIGN PATENT DOCUMENTS

| | | |
|---|---|---|
| GB | 1309721 | 3/1973 |
| GB | 2130340 A | 5/1984 |
| GB | 2199375 A | 7/1988 |

OTHER PUBLICATIONS

Applicant-Admitted Prior Art: V2500 Fact Sheet, International Aero Engines, http://i-a-e.com/wp-content/uploads/2012/03/facts.pdf Jun. 15, 2012.

Applicant-Admitted Prior Art: Diagram "GE 90 Engine Airflow" http://ctr-sgi1.stanford.edu/CITS/ge90.html downloaded Jun. 15, 2012.

Applicant-Admitted Prior Art: TFE 731-20 PR Sheet, http://design.ae.utexas.edu/subjet/work/TFE731_4.jpg downloaded Jun. 15, 2012.

Applicant-Admitted Prior Art: Rolls Royce Trent 800, cutaway view, http://www.epower-propulsion.com/epower/gallery/ABP-RR%20Trent%20800%20cutaway.htm downloaded Jun. 15, 2012.

Applicant-admitted prior art: Rolls-Royce Trent cutaway view from http://web.mit.edu/aeroastro/labs/gtl/early_GT_history.html downloaded Jun. 15, 2012.

Applicant-admitted prior art: Garrett TFE 731-3 sectional view from http://perso.ovh.net/~caeaxtke/fr/coll/falcon50_5.html downloaded Jun. 15, 2012.

Applicant-admitted prior art: Rolls-Royce Trent 1000 cutaway view from http://hackedgadgets.com/2011/08/02/how-to-build-a-rolls-royce-trent-1000-jet-engine-used-in-the-boeing-787/ downloaded Jun. 15, 2012.

Applicant-admitted prior art: Rolls-Royce Trent cutaway view from http://www.warandtactics.com/smf/planet-earth-the-serious-stuff-non-mil-news/a-380-emergency-landing!/ downloaded Jun. 15, 2012.

European Search Report for EP Patent Application No. 12172350.6, dated Jan. 28, 2014.

Michael Cusick, "Avco Lycoming's ALF 502 High Bypass Fan Engine," SAE Technical Paper 810618, 1981, doi:10.4271/810618, Society of Automotive Engineers, Inc., Warrendale, PA.

Karl R. Fledderjohn, "The TFE731-5: Evolution of a Decade of Business Jet Service," SAE Technical Paper 830756, 1983, doi:10.4271/830756, Society of Automotive Engineers, Inc., Warrendale, PA.

T. A. Dickey. and E.R. Dobak, "The Evolution and Development Status of the ALF 502 Turbofan Engine," SAE Technical Paper 720840, 1972, doi:10.4271/720840, Society of Automotive Engineers, Inc., Warrendale, PA.

Jane's Aero-Engines, Ivchenko-Progress AI-727M, 2011, IHS Global Limited, Coulsdon, United Kingdom.

Jane's Aero-Engines, Rolls-Royce M45H, IHS Global Limited, Coulsdon, United Kingdom, 2010.

Jane's Aero-Engines, Turbomeca Aubisque, IHS Global Limited, Coulsdon, United Kingdom, 2009.

Jane's Aero-Engines, Aviadvigatel D-110, IHS Global Limited, Coulsdon, United Kingdom, 2010.

Jane's Aero-Engines, Honeywell LF502, IHS Global Limited, Coulsdon, United Kingdom, 2012.

Jane's Aero-Engines, Honeywell LF507, IHS Global Limited, Coulsdon, United Kingdom, 2012.

Jane's Aero-Engines, Honeywell TFE731, IHS Global Limited, Coulsdon, United Kingdom, 2012.

Jane's Aero-Engines, Ivchenko-Progress D-727, IHS Global Limited, Coulsdon, United Kingdom, 2007.

Jane's Aero-Engines, Ivchenko-Progress D-436, IHS Global Limited, Coulsdon, United Kingdom, 2012.

Applicant-Admitted Prior Art: Flight International, Avco Lycoming ALF502F-2 Cutaway, 2007, http://www.flightglobal.com/airspace/media/aeroenginesjetcutaways/avco-lycoming-alf502r-2-cutaway-5582.aspx.

Applicant-Admitted Prior Art: Flight International, Lycoming LF507F Cutaway, 2007, http://www.flightglobal.com/airspace/media/aeroenginesjetcutaways/avco-lycoming-alf502r-2-cutaway-5582.aspx.

Applicant-Admitted Prior Art: Flight International, Garrett TFE531 Cutaway, 2007,http://www.flightglobal.com/airspace/media/aeroenginesjetcutaways/avco-lycoming-alf502r-2-cutaway-5582.aspx.

NASA Conference Publication 2077, "Quiet, Powered-Lift Propulsion", Conference held at Lewis Research Center, Cleveland, Ohio, Nov. 14-15, 1978, pp. 79-81.

* cited by examiner

FAN ROTOR SUPPORT

CROSS-REFERENCE TO RELATED APPLICATIONS

This is a Continuation-in-Part of Ser. No. 12/622,535, filed Nov. 20, 2009, and entitled "Bellows Preload and Centering Spring for a Fan Drive Gear System" and benefit is claimed of U.S. patent application Ser. No. 61/498,515, filed Jun. 17, 2011, and entitled "Fan Rotor Support" and U.S. patent application Ser. No. 61/593,184, filed Jan. 31, 2012, and entitled "Fan Rotor Support", the disclosures of which are incorporated by reference herein in their entireties as if set forth at length.

BACKGROUND

The disclosure relates to gas turbine engines. More particularly, the disclosure relates to turbofan engines with speed reducing transmissions. A complicating factor in any engine design is the need to enable the engine to flex sufficiently while at the same time accounting for tension loads and torsional stresses experienced by the engine while in flight.

SUMMARY

One aspect of the disclosure involves a turbofan engine comprising an engine case. A gaspath extends through the engine case. A fan has a circumferential array of fan blades. A fan case encircles the fan blades radially outboard of the engine case. A plurality of fan case vanes extend aftward and outward from the engine case to the fan case. A forward frame comprises a plurality of vanes radially across the gaspath. A torque box couples the fan case vanes to the forward frame. A transmission couples a shaft to a fan shaft to drive the fan. A fan bearing assembly couples a stationary forward hub structure to the fan shaft.

In various further embodiments of any of the foregoing embodiments, the engine bypass ratio may be greater than about 4.0.

In various further embodiments of any of the foregoing embodiments, the transmission may be an epicyclic transmission.

In various further embodiments of any of the foregoing embodiments, the transmission may have a circumferential array of gears having a centerplane.

In various further embodiments of any of the foregoing embodiments, the fan may have a front bearing and a rear bearing, the rear bearing having a centerplane. A distance between the gear centerplane and the rear fan bearing centerplane may be less than twice in axial length of the gears of the array.

In various further embodiments of any of the foregoing embodiments, a distance between the gear centerplane and the center of the fan bearing system may be less than three times the axial length of the gears of the array.

In various further embodiments of any of the foregoing embodiments, a torque box may couple the fan case vanes to the forward frame.

In various further embodiments of any of the foregoing embodiments, the torque box may be formed by an outboard portion of the forward frame, inboard portions of the fan case vanes, and an aft web.

In various further embodiments of any of the foregoing embodiments, the shaft may be a low pressure turbine shaft.

In various further embodiments of any of the foregoing embodiments, the fan case vanes may have a characteristic sweep angle of less than 75° relative to the centerline of the engine. The characteristic sweep angle may be 55-75° relative to the centerline.

In various further embodiments of any of the foregoing embodiments, the stationary hub may have a characteristic angle of 55-75° relative to the centerline.

In various further embodiments of any of the foregoing embodiments, the forward hub structure may taper forwardly and inwardly from a mounting flange coupling the forward hub structure to the forward frame to a center of the fan bearing assembly.

In various further embodiments of any of the foregoing embodiments, an overall conical profile from the forward hub structure to the fan case may pass entirely locally through the fan case vanes.

In various further embodiments of any of the foregoing embodiments, the engine may have at least one compressor section, a combustor, and at least one turbine section and the shaft may be a turbine shaft.

In various further embodiments of any of the foregoing embodiments, the at least one compressor section may comprise a high pressure compressor section and a low pressure compressor section and the at least one turbine section may comprise a high pressure turbine section and a low pressure turbine section and the shaft may be a low pressure turbine shaft coupling the low pressure turbine section to the low pressure compressor section and a high pressure shaft may couple the high pressure turbine section to the high pressure compressor section.

In various further embodiments of any of the foregoing embodiments, a flexure structure may be mounted to the forward frame and coupled to the transmission to counter torque.

In various further embodiments of any of the foregoing embodiments, the fan bearing assembly may be a duplex tapered roller bearing assembly and a bellows spring may engage an outer race of at least one of the bearings of the duplex tapered roller bearing.

In various further embodiments of any of the foregoing embodiments, an aircraft may comprise a wing, the engine, and a pylon mounting the engine to the wing. The pylon may be mounted to the fan case and the engine case.

Another aspect of the disclosure involves a turbofan engine having an engine case, a gaspath through the engine case, and a fan having a circumferential array of fan blades. The shaft is coupled to a turbine. An epicyclic transmission couples the shaft to a fan shaft to drive the fan. The epicyclic transmission has a star carrier. A flange structure couples the engine case to the star carrier and has a body mounted to the engine case and a plurality of fingers extending from the body to engage the star carrier.

In various further embodiments of any of the foregoing embodiments, the engine bypass ratio may be greater than about 4.0.

In various further embodiments of any of the foregoing embodiments, the fan may comprise an axially compliant and radially compliant flexure so that the flange structure transmits a majority of axial retention torques (about the engine centerline) to the star carrier but does not provide a majority of axial and radial retention forces to the star carrier.

Another aspect of the disclosure involves a turbofan engine having an engine case defining a centerline and a gaspath within the case. A fan has a circumferential array of fan blades. A fan case encircles the fan blades. A transmission couples a shaft to the fan to drive the fan. The engine has a stationary forward hub structure. A fan bearing assembly couples the forward hub structure to a fan shaft. A support frame couples the fan case, the engine case, and the stationary hub and includes a plurality of supports radially across the gaspath. A plurality of fan case vanes extend aftward and outward from the support frame to the fan case. In various further embodiments of any of the foregoing embodiments, the engine bypass ratio may be greater than about 4.0.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
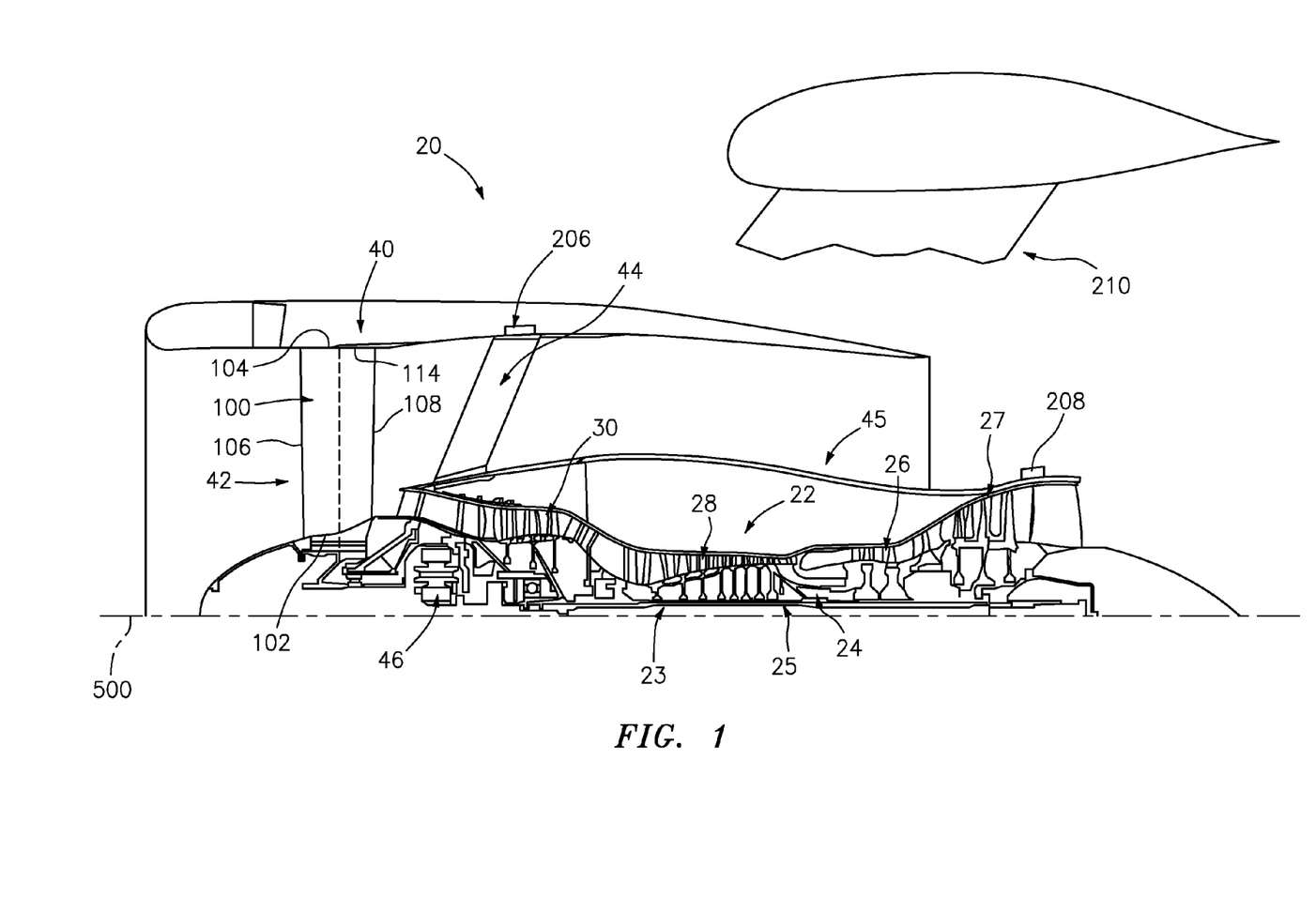
FIG. 1 is a longitudinal axial sectional/cutaway view of an embodiment of a turbofan engine.

FIG. 1 shows a turbofan engine 20 having an engine case 22 containing a rotor shaft assembly 23. An exemplary engine is a high-bypass turbofan. In such an engine, the normal cruise condition ratio of air mass flowing outside the core (e.g., the compressor sections and combustor) to air mass passing through the core (the bypass ratio) is typically in excess of about 4.0 and, more narrowly, typically between about 4.0. and about 16.0. Via high 24 and low 25 shaft portions of the shaft assembly 23, a high pressure turbine (HPT) section 26 and a low pressure turbine (LPT) section 27 respectively drive a high pressure compressor (HPC) section 28 and a low pressure compressor (LPC) section 30. The engine extends along a longitudinal axis (centerline) 500 from a fore end to an aft end. Adjacent the fore end, a shroud (fan case) 40 encircles a fan 42 and is supported by vanes 44. An aerodynamic nacelle around the fan case is shown and an aerodynamic nacelle 45 around the engine case is shown.

Although a two-spool (plus fan) engine is shown, an alternative variation involves a three-spool (plus fan) engine wherein an intermediate spool comprises an intermediate pressure compressor (IPC) between the LPC and HPC and an intermediate pressure turbine (IPT) between the HPT and LPT.

In the exemplary embodiment, the low shaft portion 25 of the rotor shaft assembly 23 drives the fan 42 through a reduction transmission 46. An exemplary reduction transmission is an epicyclic transmission, namely a planetary or star gear system.

Figure 5:
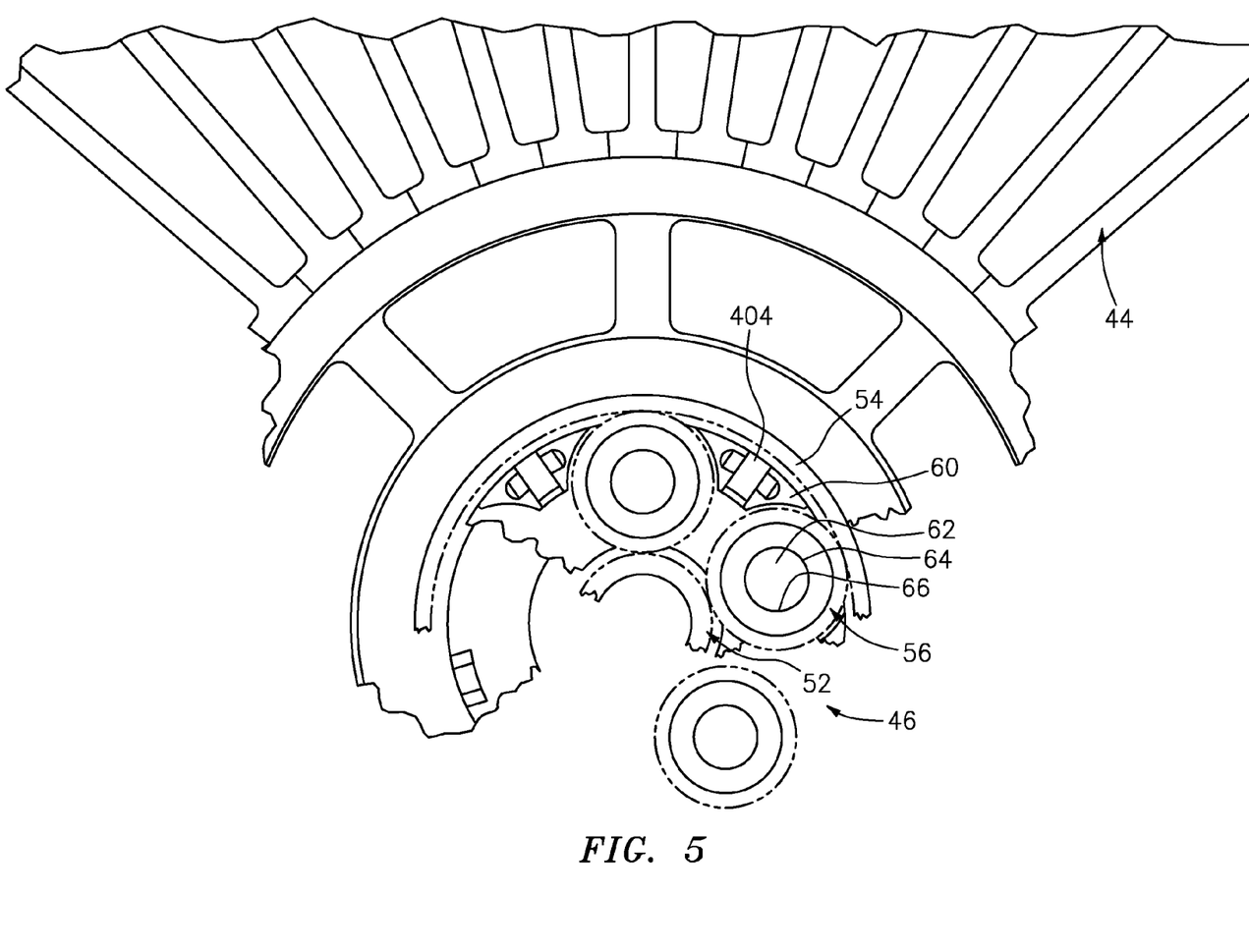
FIG. 5 is partial transverse sectional/cutaway view of a forward portion of the engine of FIG. 1.

FIG. 5 schematically shows details of the exemplary transmission 46. A forward end of the low shaft is coupled to a sun gear 52. The externally-toothed sun gear is encircled by an internally-toothed ring gear 54. The exemplary ring gear is coupled to the fan to rotate with the fan as a unit.

A number of externally-toothed star gears 56 are positioned between and enmeshed with the sun gear and ring gear. A cage or star carrier assembly 60 carries the star gears via associated journals 62. The exemplary star carrier is substantially non-rotatably mounted relative to the engine case 22. The journals have circumferential surface portions 64 closely accommodated within internal bore surfaces 66 of the associated star gears.

Other combinations of which of the sun, star carrier and ring are mounted to the fan, low shaft, fixed structure (case) (or are permitted to rotate freely) are possible. For example, in other embodiments the ring gear may be stationary whereas the planetary/star gears may rotate around the sun gear.

The speed reduction ratio is determined by the ratio of diameters of the ring gear to the sun gear. This ratio will substantially determine the maximum number of star gears in a given ring. The actual number of star gears will be determined by stability and stress/load sharing considerations. An exemplary reduction is between about 2:1. and about 13:1. Although only one star gear is necessary, in exemplary embodiments, the number of star gears may be between about 3. and about 11.

The fan comprises a rotor having a plurality of aerodynamic blades 100 (FIG. 1) arrayed around the centerline 500. The fan provides the primary motive air flow to the gas generator air stream (the core flow) and the fan duct flow (the bypass flow). Air exiting the fan rotor has increased pressure and axial and tangential flow velocity. The bypass flow velocity may be redirected or straightened by the structural guide vanes 44. The fan blade airfoils extend from inboard ends 102 to outboard tips 104, and have a leading edge 106, a trailing edge 108, a pressure side, and a suction side. The tips are in close facing proximity to a rub strip 114 along the interior of the fan case.

At the inboard ends 102, the blades (if separate) are attached to a fan disk 120 (FIG. 2) which transmits torque to the blades and provides support and retention to the blades. The exemplary disk 120 comprises an outer ring 122 to which the blades are attached and a forwardly, inwardly tapering web 124. At its inboard end, the web 124 joins a collar 126 which receives a forward portion of a tubular portion 130 of a fan shaft 132. At a rearward end, the fan shaft tubular portion joins a partially radial web or hub 136 which extends outward and then axially aftward and is secured to a bolting flange 140 on the periphery of the ring gear. As is discussed below, the fan shaft, via this web 136, both receives torque from the LPT (via the transmission) and provides radial and axial positioning to the transmission.

Figure 3:
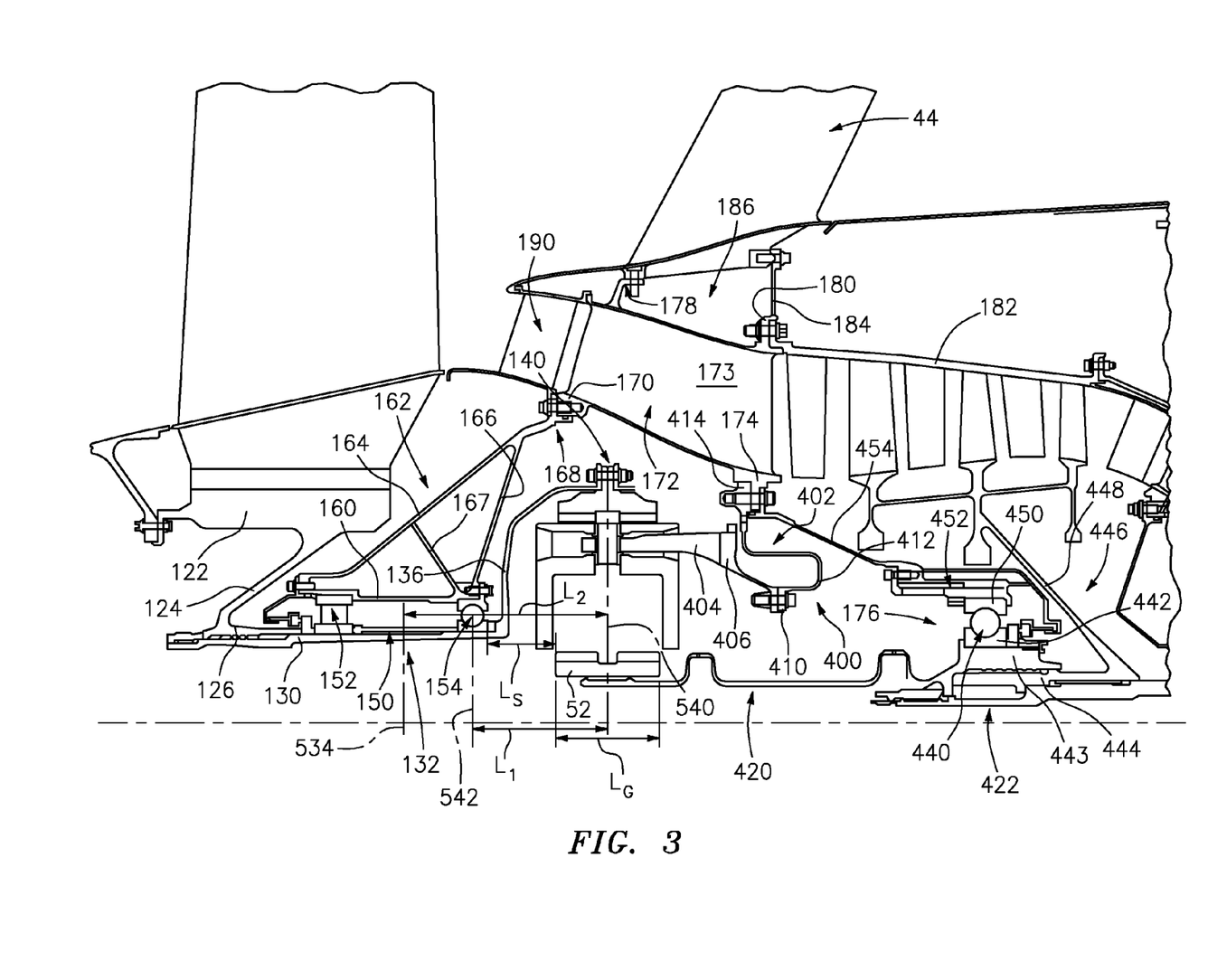
FIG. 3 is a longitudinal axial sectional/cutaway view of a forward portion of the engine of FIG. 1.

As shown in FIG. 3, the fan shaft is surrounded and supported by a duplex bearing system 150 (e.g., having a forward bearing 152 and an aft bearing 154 spaced apart and as described in the '535. application noted above). Exemplary bearing systems are a ball and roller duplex or a tapered duplex. As in the '535 application, the bellows spring may engage an outer race of at least one of the bearings of the duplex tapered roller bearing. The fan shaft thus joins inner races of the two bearings. The outer races of the two bearings are joined by a tubular radially inboard portion 160 of a fan rotor bearing support structure 162 (forward hub structure). The fan rotor bearing support structure includes a forward web 164 extending outward and aftward from an inboard end of the tubular structure 160 at an exemplary angle in the vicinity of 45°. An aft web 166 extends from an aft end of a tubular portion 160 and also extends aftward and outward but at a more radial inclination. The two webs 164, 166 join at a root of an outboard/aft mounting flange 168. As is discussed further below, the fan rotor bearing support structure 162 supports all degrees of freedom of the fan while allowing rotation about the centerline. FIG. 3 also shows a rearwardly converging web 167 joining the web 164 to a rear inboard end of the web 166 and rear end of tubular structure 160.

The flange 168 is mounted to a mating flange 170 of a front frame assembly 172 (e.g., shown having a circumferential array of struts (e.g., airfoil-shaped structures) 173 substantially smaller in number than the vanes 44). This assembly 172 is forward of a forward engine frame 182 that includes a plurality of stages of vanes that extend radially across the gaspath. The assembly 172 has an inboard rear bolting flange 174 which, as is described further below, is coupled to the star carrier and to a low shaft forward bearing assembly 176. The assembly 172 has an outboard forward mounting flange 178 to which inboard forward portions of the vanes 44 are mounted. The assembly 172 has an outboard rear mounting flange 180 to which an engine case segment 182 is mounted and which, via a radial web 184, is mounted to inboard rear portions of the vanes 44.

The four-sided (viewed in section) structure 186 formed by the outer structures of assembly 172, inner structures of vanes 44 form an annular box beam often called a torque box. The torque box accumulates loads in all degrees of freedom from the radial core strut assembly 172 and distributes loads in all degrees of freedom to the vane array 44. The torque box structure is especially efficient in transmitting torsion loads about the engine centerline and trunion moments normal to the engine centerline. The torsion and trunion moments place three degrees of bending load into the vane 44 and strut assembly 172 airfoil shaped structures 173. Alternatively torque box 186 could be a three-sided structure.

A structural load path is thus provided through the fan hub support, the frame strut assembly, the array of vanes 44, to the engine case (and, at least in the exemplary embodiment to a pylon 210).

FIG. 3 shows an array of fan exit stator vanes 190 positioned ahead of the fan frame. These remove swirl from exiting from proximal portion to the fan blades. Such vanes may be integrated into the fan frame in alternative implementations.

Figure 2:
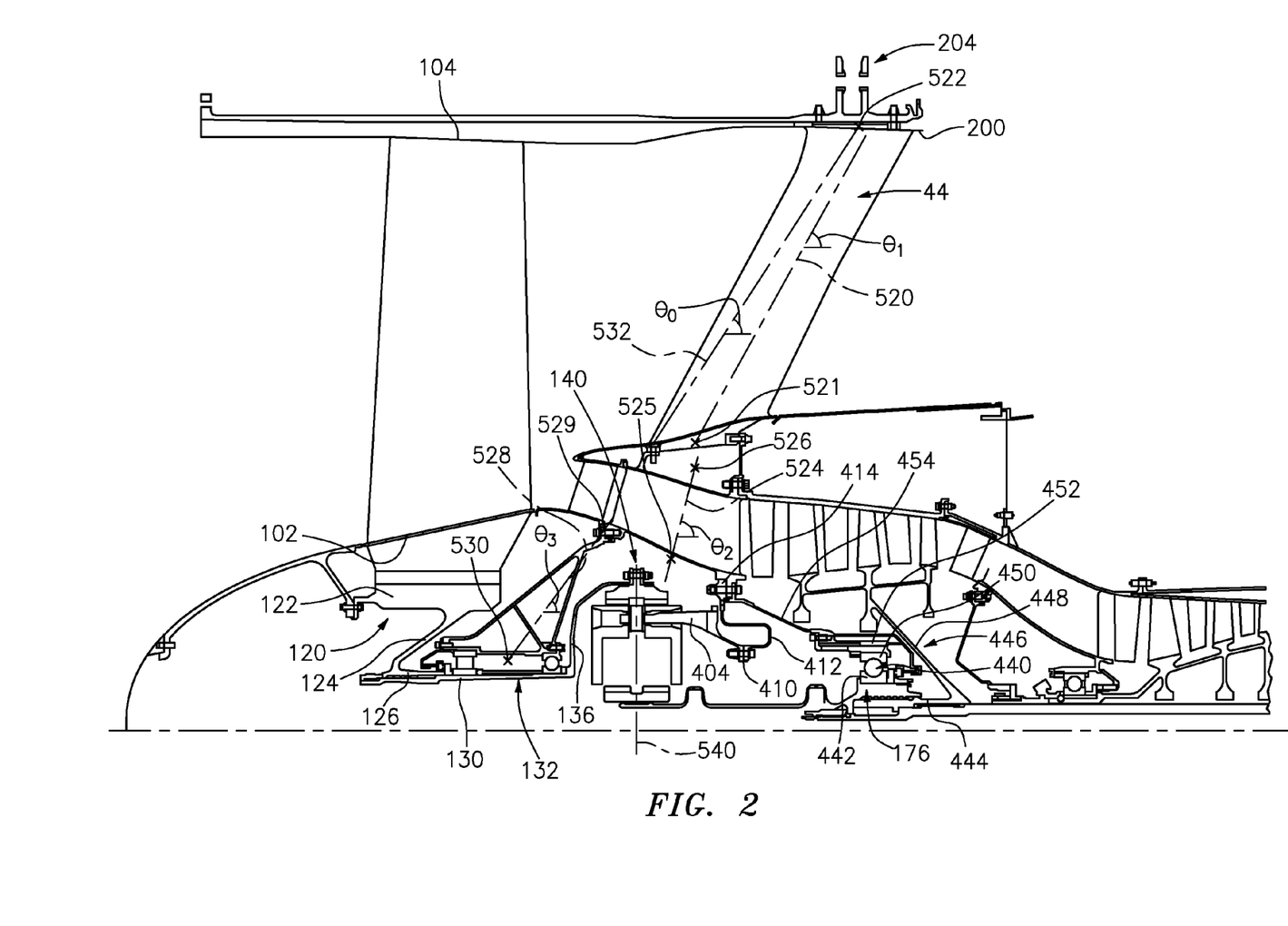
FIG. 2 is a longitudinal axial sectional/cutaway view of a forward portion of the engine of FIG. 1.

As shown in FIG. 2, the exemplary vanes 44 have a characteristic line 520 (e.g., a linear fit to the median of the airfoil shape) at an angle $\theta_1$. relative to the engine centerline 500. The exemplary $\theta_1$. is less than 75° relative to the engine centerline, more narrowly, 50-75° or 55-70°. Alternatively defined, an angle in such a range may be along a majority of the leading and/or trailing edges of the vanes or may be along a majority of the axial span of a median. Such an angle may alternatively be characterized as essentially the angle between centers 521 and 522 respectively of inboard and outboard mounting points or of inboard and outboard ends of the airfoil portion of the vane. If the vanes are canted, such an angle may be a projection onto an intersecting axial/radial plane.

A similarly defined line 524 of the front frame strut assembly (passing through a center 525 of inboard flanges of the airfoil shaped structures 173 and a center 526 of outboard flanges thereof) is at an angle $\theta_2$. relative to the engine centerline. Exemplary $\theta_2$. is steeper than $\theta_1$. (e.g., 70-85° or 65-90°).

A line 528 between a location 529 along a mating face of the outboard flange of the fan rotor bearing support and a center 530 (of the axial half section (along bearing transverse centerplane 534) (as shown in FIG. 3)) of its bearing system is shown at an angle $\theta_3$. relative to the engine centerline. Exemplary $\theta_3$. is in a similar range to $\theta_1$. above.

A line 532 extends from the bearing center 530 to the location 522 or center of the outboard end of the airfoil of the vane 44. The line is at an angle $\theta_0$. relative to the engine centerline. Exemplary $\theta_0$. is slightly less than $\theta_1$. For example, exemplary $\theta_0$. is about 5° less than $\theta_1$. More broadly, exemplary $\theta_0$ is between 15° less and 5° more than $\theta_1$. An exemplary range is 50-70°.

The combination of angles, most notably $\theta_1$. and $\theta_3$. is such that the force transmission path from the fan bearing system to the fan case stays relatively close to the line 532 (and to the cone represented by revolving that line about the centerline). The line 532 thus locally falls within or nearly within the airfoil of the vane 44 so that fan rotor shear and overturning trunion moments are transmitted in an efficient straight line conical path through vane 44. (e.g., the line 532 does not go more than half of the local chord of the airfoil ahead of the airfoil at any point along the airfoil, more narrowly 20%). Vane 44 is thus loaded more predominantly in tension or compression. If vane 44 central line 520 is further off the line 532, a given load will induce greater internal bending moments in vane 44. The conical frame structural arrangement therefore, in various embodiments, carries the dominating fan rotor loads more efficiently. The more efficient structure is also stiffer and controls fan blade tip clearances more effectively. Tighter fan tip clearances improve engine performance.

As shown in FIG. 3, a centerplane 540 of the gears may be located at a very minimal distance $L_1$. from the rear fan bearing 154 centerplane 542 by sharply curving the fan shaft hub 136. Exemplary centerplane-to-centerplane distance $L_1$. is less than about twice the gears' axial length $L_G$, more narrowly, less than about 1.5. times, with an axial spacing $L_S$. between the adjacent ends of the gears and bearing 154 less than the gear length $L_G$. The centerplane 540 may be a distance $L_2$. aft of the center 534 of the fan bearing system of less than about 3.0. times the gear length $L_G$, more narrowly less than about 2.5. times or about 2.0 times.

Figure 4:
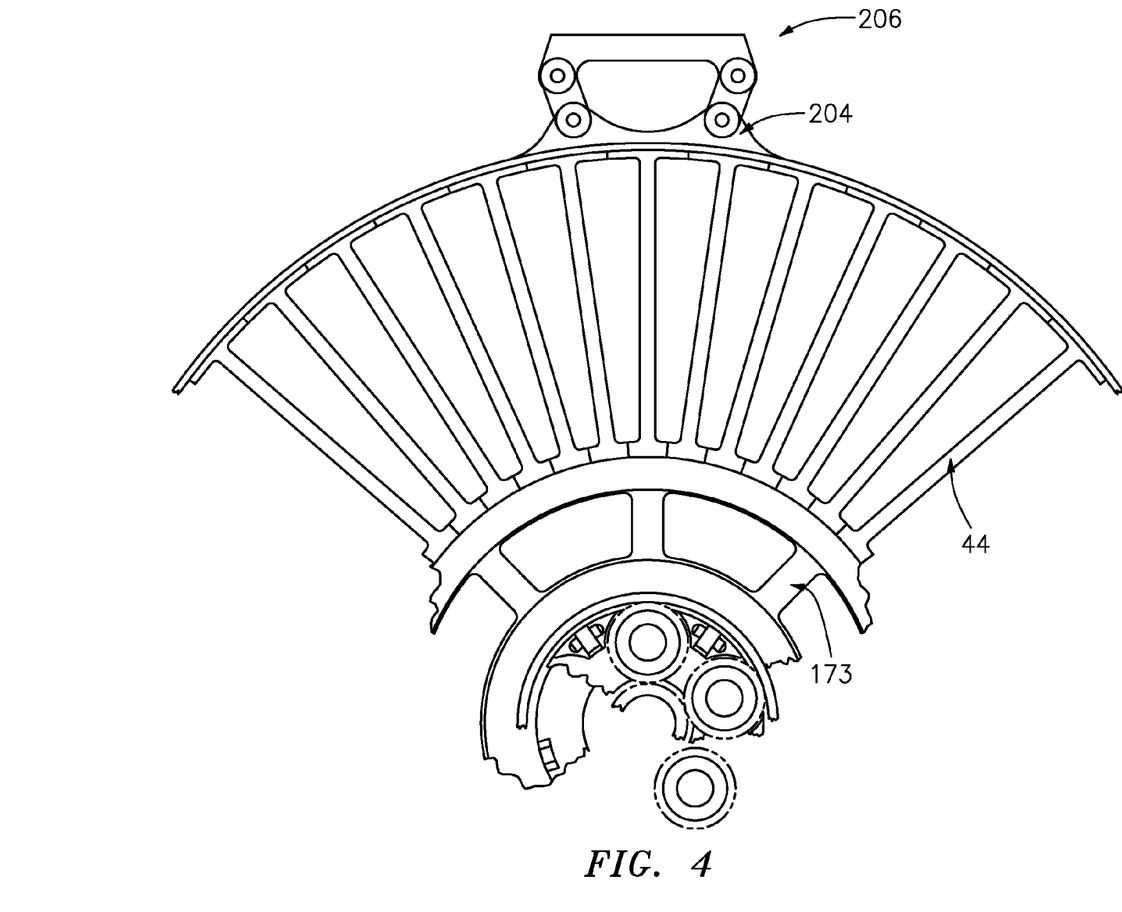
FIG. 4 is partial transverse sectional/cutaway view of a forward portion of the engine of FIG. 1.

As shown in FIG. 2, at their outboard ends, the vanes 44 have flanges 200 bolted to an inner ring structure of the fan case to tie the outboard ends of the vanes together. Integral therewith or fastened thereto is a forward mounting structure 204 (e.g., clevises which form part of a four bar mechanism 206 (FIG. 4)) and provides forward support to the engine (e.g., vertical and lateral support).

To mount the engine to the aircraft wing, the pylon 210 (FIG. 1) is mounted to the mechanism 206 (FIG. 4) (e.g., forming the outer part thereof). The pylon is also mounted to a rear engine mount 208 (as shown in FIG. 1).

The exemplary carrier 60 is held by a flanged flexure structure 400 (FIG. 3) against rotation about the centerline. The exemplary flanged flexure structure 400 comprises a body 402 mounted to the case and a plurality of fingers 404 extending forward from a ring 406 bringing the body 402 into engagement with the carrier 60 (FIG. 5). The exemplary fingers 404 extend into corresponding apertures in the carrier 60 and are secured via radial pinning near their distal ends. Proximal end portions of the fingers are secured to or unitarily formed with the ring 406 which is bolted to an inboard flange 410 of the body spaced rearwardly of the outboard flange. The flexure has a flexible portion 412 extending in convoluted axial cross-section to an outboard flange 414 bolted to the aft inboard flange 174 of the front frame strut assembly. The flexure, via the fingers, thus retains the carrier 60 against all but small (e.g., vibratory level) rotational movements about the axis 500 while allowing the carrier 60 to otherwise accommodate engine distortion due to thrust loads. Thus, the flange structure and its flexure transmit all or the majority of axial retention torque to the star carrier but do not transmit a majority of axial and radial retention forces to the star carrier 60.

A fan drive input coupling 420 couples the sun gear 52 to the forward portion 422 of the low shaft 25. A forward/distal portion of the coupling 420 is received in the bore of the sun and irrotatably secured thereto. The coupling 420 has sufficient axial and radial compliance so that it effectively only transmits torque about the centerline but allows other angular excursions and position excursions.

Radial support of the low shaft is provided by a plurality of bearing systems. The exemplary forwardmost bearing assembly 176 is a thrust bearing system near the forward end of the shaft. The exemplary thrust bearing system includes a bearing 440 that has an inner race 442 mounted to and encircling a proximal portion 443 of the fan drive input coupling 420 at a forward end of the low shaft. A collar 444 of a hub 446 of the LPC rotor is sandwiched between the shaft and the input coupling proximal portion. The web 448 of the hub 446 extends radially outwardly and forwardly from a junction with an aft end of the collar 444 to join with a web of a disk (the middle of three disks in the example) of the LPC rotor. The outer race 450 of the bearing assembly 176 is mounted to a ring structure 452. A bearing support in the form of a shallow web 454 extends forward and outward from a bolted joint with the ring structure to the bolted joint with the inboard aft flange 174 of the front frame strut assembly. The exemplary web 454 is relatively shallow (e.g., at 10-45° off axial, more narrowly, 20-40° or 20-35°).

One or more embodiments have been described. Nevertheless, it will be understood that various modifications may be made. For example, when implemented in the reengineering of a baseline engine, details of the baseline may influence details of any particular implementation. Accordingly, other embodiments are within the scope of the following claims.

What is claimed is:

1. A turbofan engine comprising:
an engine case, the engine case defining a centerline and a gaspath within the engine case;
a fan having a circumferential array of fan blades;
a fan case encircling the fan blades radially outboard of the engine case;
a plurality of fan case vanes extending aftward and outward from the engine case to the fan case, the fan case vanes having a characteristic sweep angle ($\theta_1$) of less than 75° relative to the engine centerline;
a forward frame comprising a plurality of vanes radially across the gas path;
a shaft;
a transmission coupling the shaft to a fan shaft to drive the fan;
a stationary forward hub structure; and
a fan bearing assembly coupling the stationary forward hub structure to the fan shaft, wherein:
the stationary forward hub has a characteristic angle ($\theta_3$) of 55-70° relative to the centerline;
there is only a single stage of said fan case vanes and wherein fan rotor loads are transmitted at least partially via internal bending moments in the single stage of said fan case vanes; and
in section, a line between a center of the bearing assembly and a mounting structure on the fan case does not go more than half the local chord of an airfoil of the fan case vanes ahead of the vanes at any point along the airfoil.

2. The engine of claim 1 wherein the engine bypass ratio is greater than about 4.0.

3. The engine of claim 1 wherein:
the transmission is an epicyclic transmission.

4. The engine of claim 1 wherein:
the transmission has a circumferential array of gears having a centerplane;
the fan has a front bearing and a rear bearing, the rear bearing having a centerplane; and
a distance ($L_1$) between the gear centerplane and the rear fan bearing centerplane is less than about 1.5 times an axial length (LG) of the gears of the array.

5. The engine of claim 1 wherein:
the transmission has a circumferential array of gears having a centerplane;
the fan has a bearing system including a front bearing and a rear bearing; and
a distance ($L_2$) between the gear centerplane and the center of the fan bearing system is less than about 2.5 times an axial length ($L_G$) of the gears of the array.

6. The engine of claim 1 wherein:
a torque box couples the fan case vanes to the forward frame.

7. The engine of claim 6 wherein:
the torque box is formed by an outboard portion of the forward frame, inboard portions of the fan case vanes, and an aft web.

8. The engine of claim 1 wherein:
the fan case vanes characteristic sweep angle ($\theta_1$) is 55-70° relative to the centerline.

9. The engine of claim 1 wherein:
the forward hub structure tapers forwardly and inwardly from a mounting flange coupling the forward hub structure to the forward frame to a center of the fan bearing assembly.

10. The engine of claim 1 wherein:
an overall conical profile from the forward hub structure to the fan case passes entirely locally through the fan case vanes.

11. The engine of claim 1 wherein:
the engine has at least one compressor section, a combustor, and at least one turbine section; and
the shaft is a turbine shaft.

12. The engine of claim 11 wherein:
the at least one compressor section comprises a high pressure compressor section and a low pressure compressor section;
the at least one turbine section comprises a high pressure turbine section and a low pressure turbine section;
the shaft is a low pressure turbine shaft coupling the low pressure turbine section to the low pressure compressor section; and
a high pressure shaft couples the high pressure turbine section to the high pressure compressor section.

13. The engine of claim 1 further comprising:
a flexure structure mounted to the forward frame and coupled to the transmission to counter torque.

14. The engine of claim 1 wherein:
the fan bearing assembly is a duplex tapered roller bearing assembly and a bellows spring engages an outer race of at least one of the bearings of the duplex tapered roller bearing.

15. An aircraft comprising:
a wing;
the engine of claim 1; and
a pylon mounting the engine to the wing.

16. The aircraft of claim 15 wherein:
the pylon is mounted to the fan case and the engine case.

17. A turbofan engine comprising:
an engine case;
a gaspath through the engine case;
a fan having a circumferential array of fan blades;
a turbine;
a shaft coupled to the turbine;
a fan case encircling the fan blades radially outboard of the engine case;

only a single stage of fan case vanes extending aftward and outward from the engine case to the fan case, the fan case vanes having a characteristic sweep angle ($\theta_1$) of less than 75° relative to the engine centerline;

a forward frame comprising a plurality of vanes radially across the gaspath;

a stationary forward hub structure;

an epicyclic transmission coupling the shaft to a fan shaft to drive the fan and having:
  a star carrier;
a flange structure coupling the engine case to the star carrier and comprising:
  an outboard flange mounted to the engine case;
  an inboard flange spaced rearwardly of the outboard flange;
  a plurality of fingers extending from the inboard flange to engage the star carrier; and
  an axially compliant and radially compliant flexure between the outboard flange and the inboard flange; and
a fan bearing assembly coupling the stationary forward hub structure to the fan shaft,
  wherein an overall conical profile from the forward hub structure to the fan case passes entirely locally through the fan case vanes.

18. The engine of claim 17 wherein the engine bypass ratio is greater than about 4.0.

19. A turbofan engine comprising:
an engine case, the engine case defining a centerline and a gaspath within the engine case;
a fan having a circumferential array of fan blades;
a fan case encircling the fan blades;
a shaft;
a transmission coupling the shaft to the fan to drive the fan;
a stationary forward hub structure;
a fan bearing assembly coupling the forward hub structure to a fan shaft;
a support frame coupling the fan case, the engine case, and the stationary hub and including a plurality of supports radially across the gaspath; and
only a single stage of fan case vanes extending aftward and outward from the support frame to the fan case, the fan case vanes having a characteristic sweep angle ($\theta_1$) of less than 75° relative to the engine centerline,
wherein:
  an overall conical profile from the forward hub structure to the fan case passes entirely locally through the fan case vanes.

20. The engine of claim 19 wherein the engine bypass ratio is greater than about 4.0.

21. The engine of claim 1 wherein, in said section, said line does not go more than 20% of the local chord of the airfoil of the fan case vanes ahead of the vanes at any point along the vanes.

22. The engine of claim 1 wherein, in said section, the line falls locally within the airfoil along the entire airfoil.

23. The engine of claim 19 wherein:
fan rotor loads are transmitted via internal bending moments in the single stage of said fan case vanes.

24. The engine of claim 1 wherein:
wherein said fan rotor loads are transmitted via internal bending moments only in the single stage of said fan case vanes.

25. The turbofan engine of claim 1 wherein:
there is only a single said circumferential array of fan blades.

* * * * *